Patented June 24, 1947

2,423,032

UNITED STATES PATENT OFFICE 2,423,032

RECLAIMING SYNTHETIC RUBBER WITH AN AMINE

Rée Vilma le Beau, Cambridge, Mass., assignor, by mesne assignments, to Midwest Rubber Reclaiming Company, East St. Louis, Ill., a corporation of Delaware No Drawing. Application January 9, 1943, Serial No. 471,882

12 Claims. (Cl. 260—36)

My present invention relates to reclaiming synthetic fully or partially vulcanized or "scorched" rubbers to make them useful technically, and includes a single identical process which will reclaim successfully the several types of synthetic rubbers, i. e. previously vulcanized synthetic, not fully saturated diolefin polymers, including copolymers, alkylene polysulfides and mixtures thereof. Natural rubber may also be successfully reclaimed by the process and mixtures of various synthetic and natural rubbers.

With the increased production and use of synthetic rubbers commercial rubber scrap is beginning to contain different types of rubber. For instance, waste gasoline hose may contain synthetic rubbers as well as natural rubbers. Owing to the similarity in appearance and their intimate relation in the waste, it is not practical to sort them, and, in fact, in many cases is impossible to separate them.

At the present time synthetic rubbers are very expensive and the supply limited and, therefore, it is important to be able to reclaim them. With the increased use of synthetic rubbers, waste rubber becomes mixed more and more with synthetic rubbers and, therefore, in the absence of a process by which both natural and synthetic rubbers, can be reclaimed simultaneously, the reclaiming of either rubber is interfered with or prevented.

Heretofore natural rubbers have been reclaimed by several processes, for instance, by the use of alkalies and oils at high pressures and temperatures; by the use of acids, also under high pressures and temperatures, and to some extent by digestion in rubber solvents. Attempts have also been made to bring synthetic and natural vulcanized rubbers to a reworkable condition by working them mechanically for a long time with large proportions of plasticizer, but the results have been unsatisfactory. So far it has not been possible to reclaim synthetic rubbers successfully—much less has it been thought that any single process could be devised to reclaim both synthetic and natural rubbers simultaneously since they have different chemical and physical characteristics. As far as I have been able to ascertain, no successful and economically practical process of reclaiming synthetic rubbers has been devised and it may well have been assumed that none could be.

As is well known to those skilled in the art, "neoprene," which is a trade name for polymerized chloroprene

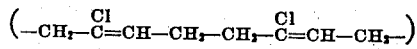

is not in general compatible with natural rubber or with other synthetic rubbers and sulphur is not necessary for vulcanization as with natural rubber, probably owing to the presence and effect of the chlorine which it contains in its molecule. However, when vulcanized neoprene is treated in accordance with the process herein described, it becomes not only vulcanizable with sulphur, in the same way as are natural rubber and other synthetic rubbers, but also it becomes compatible with them without losing its peculiar characteristics, such as resistance to oil and aging. Likewise mixtures of the several rubbers may be simultaneously reclaimed by the same process.

Natural rubber and the diolefin types of synthetic rubbers and their several copolymers, and alkylene polysulfides such as Thiokol, may also be treated by exactly the same method.

My present invention is based on three discoveries.

First, that certain substances, when mixed with rubber scrap of the various types already mentioned and subjected to moist heat under proper conditions, have the effect of bringing the rubber back into condition in which it can be again successfully processed.

Second, that, when treated with the reclaiming substance, vulcanized polymerized chloroprene becomes vulcanizable with sulphur in the same way as are natural or other synthetic rubbers; it does not lose its individual characteristics, such as resistance to oil and aging; and that it becomes compatible with natural or other synthetic rubbers with which in the unreacted state it was not compatible.

Third, that suitable treating substances are (1) certain organic amines, viz. aliphatic amines with one lyophobic end, and aromatic and mixed molecule amines which, if containing more than one amino group, have the groups in the ortho or meta positions with respect to each other, none of them being phenyl compounds in which the amino groups are in the 4,4′ positions, nor amines containing substitutional groups composed of metals, sulphur, SO$_3$, selenium, chlorine, bromine, iodine, fluorine, phosphorus, or a nitro or hydroxyl group, and (2) certain long chain saturated acids which do not contain hydroxyl groups in the chain.

I have also discovered that primary amines are more effective than the secondary amines, and that the secondary amines are more effective than the tertiary amines; also, that the aliphatic amines and mixed amines give softer products than pure aromatic amines, which in general give harder materials.

Certain substances, conveniently referred to as amine salts, which are combinations of amines such as mono-butyl and mono-amyl amines with high saturated fatty acids such as palmitic, lauric and stearic acids form amines during the treatment of the rubber and therefore are the equivalents of the uncombined amines.

Aliphatic amines containing at least twelve carbon atoms and particularly mixtures thereof have been found particularly satisfactory. In the examples which follow I have not attempted to give an example for each amine but I have tested many alkyl amines—primary, secondary and tertiary—containing twelve and more carbon atoms and find that they can all be used in the practice of my process. The choice of the particular amine depends to a considerable extent on the relative availability and cost.

My present invention includes both the method of reclaiming fully or partially vulcanized or "scorched" rubber, whether natural or synthetic, and the resulting products which appear to be composed of an altogether new substance or compound. The claims of the present application are, however, limited to the use of amines chosen from the classes described and the products resulting therefrom, while in a companion application filed July 21, 1941, I have claimed the method of reclaiming rubber by the use of long chain saturated acids and the products resulting therefrom.

In the present application for a patent, I have used the word "rubber" to include both natural and synthetic, vulcanized or partly vulcanized or "scorched" rubbers and the words "synthetic rubber" as a convenient phrase to include diolefin polymers, such as polymerized chloroprene, copolymers Buna-N and Buna-S and alkylene polysulfides, and as "Thiokol" and mixtures of the several rubbers. Buna N is the commonly accepted name for the copolymer of butadiene-1,3 and acrylonitrile while Buna S is likewise the name for the copolymer of butadiene-1,3 and styrene.

When using the amines as reclaiming agents, I find that it is desirable but not necessary to mix the amine with a solvent for the amine, the solvent also being capable of swelling the rubber and then to mix thoroughly the rubber with this solution. When this is done, the solvent may, if desired, be evaporated from the mixture before the mixture is treated with moist heat under proper conditions, preferably with pressure, or the solvent may be left in the mix during the treatment. The solvent carries the amine into the rubber more perfectly than is the case where no solvent is used. The fact that the reaction may be carried out effectively after the solvent has been removed shows that the amine rather than the solvent is the active reclaiming agent. The recovery of the solvent is thus technically possible.

In this application I have used the word "solvent" to include those substances which are solvents for the particular amine employed and which are also capable of swelling the rubber which is being processed. In the examples I have employed solvent naphtha, trichlorethylene and carbon tetrachloride, but such solvents as carbon tetrachloride, benzene and other solvents capable of swelling the rubber may be used. The amines used in the following examples are representative of the various types of amines which I have employed in reclaiming the several kinds of synthetic rubbers and mixtures thereof with natural rubber.

In practicing the invention, the scrap is first ground into small particles as is customary in the rubber reclaiming industry. The treatment may be carried out in either a pot-heater or in a digester.

*Example 1*

| | Grams |
|---|---|
| Scrap comprising a mixture of vulcanized natural rubber scrap, vulcanized polychloroprene (neoprene) scrap, vulcanized Buna-N type such as Hy-car, Ameripol, Perbunan, etc. scrap, vulcanized German Buna i. e. polymerized butadiene scrap, vulcanized Thiokol, an alkylene-polysulfide, scrap | 900 |
| Laurylamine | 32 |
| Solvent naphtha | 300 |

The laurylamine is dissolved in the solvent and the solution added to the scrap rubber while stirring the latter so that a thorough wetting of the particles is obtained. The mixture is then subjected to a treatment in a pot-heater during 5 hours at 190 lbs. live steam pressure.

After the pressure has been released and the scrap removed from the pot-heater it is ready for milling. It will form a sheet immediately, can be refined, recompounded and recured without any difficulties.

*Example 2A*

A specific example to illustrate the properties of reclaim obtained by this method is as follows:

| | Grams |
|---|---|
| Neoprene G. N. tire scrap | 900 |
| Laurylamine | 32 |
| Trichlorethylene | 300 |

Again the laurylamine is dissolved in the trichlorethylene and the solution added to the ground scrap while vigorously stirring the latter to obtain perfect distribution of the treating agent. The mixture is then transferred into a digester and about 2000 g. of water are added. The amount of water added will vary with the particular digester or autoclave used for the purpose. However it has to be such that during the whole length of the treatment the scrap is kept in moist condition. Furthermore it must suffice to build up the desired pressure upon heating the digester. In this particular case I found that a treatment during 5 hours at 200 lbs. pressure yielded satisfactory results. After the pressure has been slowly released the digester is opened, the wet neoprene tire scrap washed, dried and put on the mill. Three compounds which were made from the reclaim thus produced were tested for tensile strength, elongation and oil resistance with the following results:

Compound I, a standard neoprene compound:

| | Grams |
|---|---|
| Neoprene tire reclaim | 150 |
| MgO, extra light | 9 |
| ZnO | 9 |

Compound II, a modified neoprene compound containing sulphur:

| | Grams |
|---|---|
| Neoprene tire reclaim | 150 |
| MgO, extra light | 9 |
| ZnO | 9 |
| Sulphur | 2.25 |

Compound III, a standard compound for natural rubber:

| | Grams |
|---|---|
| Neoprene tire reclaim | 150 |
| ZnO | 4.5 |
| Sulphur | 2.25 |
| Mercapto benzo-thiazole | 0.9 |

All three compounds were cured in the press at 300° F. for 1 hour. The following table shows their respective properties:

| | Tensile Strength lbs. per sq. in. | Per cent Elongation | Oil Resistance |
|---|---|---|---|
| Original Neoprene GN tire scrap | | | Per cent 12.2 |
| Compound I | 450 | 300 | 18.0 |
| Compound II | 2,150 | 270 | 13.9 |
| Compound III | 2,600 | 390 | 14.1 |

It can be seen that the peak of the physical properties is obtained if the neoprene reclaim is compounded according to a standard formula for natural rubber.

Other and perhaps better results may be obtained with other formulations and cures.

Example 2B

Since the solvent serves as a carrier only for the treating agent it does not have to be present during the moist heat-pressure treatment. The following example serves as an illustration:

| | Grams |
|---|---|
| Neoprene GN tire scrap | 900 |
| Laurylamine | 32 |
| Carbon tetrachloride | 300 |

The laurylamine is dissolved in carbon tetrachloride and added to the ground neoprene tire scrap while stirring the latter as described before. The mixture is then left standing until the carbon tetrachloride has evaporated. This can be checked by weight. It is also possible to recover the carbon tetrachloride thus making the process still more economical. After all the carbon tetrachloride has been removed the neoprene tire scrap is then given treatment in either a pot-heater or a digester as described in Examples 1 or 2A.

Example 3

| | Grams |
|---|---|
| Neoprene GN tire scrap | 900 |
| Alpha naphthyl amine | 32 |
| Trichlorethylene | 300 |

The alpha naphthyl amine is dissolved in the solvent and the solution added to the ground neoprene tire scrap while stirring. The mixture is then subjected to treatment in a pot-heater for 5 hours at 190 lbs. live steam pressure. After the pressure has been released the reclaimed neoprene tire scrap is ready for further processing by milling, refining, compounding and curing.

Example 4

The difference in the activity of primary, secondary and tertiary amines is demonstrated by the following examples:

Example 4A

| | Grams |
|---|---|
| Neoprene GN tire scrap | 900 |
| Primary butylamine | 32 |
| Trichlorethylene | 300 |

Example 4B

| | Grams |
|---|---|
| Neoprene GN tire scrap | 900 |
| Secondary butylamine | 32 |
| Trichlorethylene | 300 |

Example 4C

| | Grams |
|---|---|
| Neoprene GN tire scrap | 900 |
| Tertiary butyl amine | 32 |
| Trichlorethylene | 300 |

The mixing procedure was in all three cases alike and exactly the same as described in Example 2A. The treatment was carried out in the digester for 5 hours at 200 lbs. pressure. After the pressure was released, the scrap was washed, dried and ready for milling, refining, compounding and curing. Two compounds were prepared of each of the three reclaims. These compounds were the same as compound II and compound III in Example 2A. The compounds were cured for 1 hour at 300° F. in the press. It was found on milling the three reclaims that the two compounds 4A containing reclaim made with the primary amine processed better than the two compounds 4B containing reclaim made with the secondary amine and that the two compounds 4B processed better than the two compounds 4C.

Example 5

500 g. neoprene tread scrap; 25 g. mono-isobutyl-amine; and 50 g. solvent naphtha. Treat for 5 hours at 200 lbs. steam pressure.

Example 6A 300 g. Buna-S scrap; 15 g. octylamine; and 30 g. solvent naphtha. Treat for 6 hours at 190 lbs. steam pressure.

Example 6B 300 g. Buna-S scrap; 18 g. cyclohexylamine; and 30 g. trichlorethylene. Treat for 5 hours at 200 lbs. steam pressure.

Example 7A 900 g. Buna-N type scrap; 70 g. lorolamine; and 90 g. solvent naphtha. Treat for 6 hours at 200 lbs. steam pressure.

Example 7B 900 g. Buna-N type scrap; 80 g. dicyclohexylamine; and 90 g. solvent naphtha. Treat for 7 hours at 200 lbs. steam pressure.

Example 8A 400 g. Thiokol scrap; 12 g. lorolamine; and 24 g. solvent naphtha. Treat for 5 hours at 190 lbs. steam pressure.

Example 8B 400 g. Thiokol scrap; 10 g. mono-n-hexadecylamine; and 24 g. solvent naphtha. Treat for 5 hours at 190 lbs. steam pressure.

Example 9A 900 g. mixed scrap including Buna-S; 36 g. cyclohexylamine; and 90 g. trichlorethylene. Treat for 6 hours at 150 lbs. steam pressure.

Example 9B 900 g. mixed scrap; 27 g. lorolamine; and 100 g. solvent naphtha. Treat for 5 hours at 190 lbs. steam pressure.

Lorol is described in Hackh's Chemical Dictionary, Third Edition, as follows: Trade name for a mixture of aliphatic alcohols formed by the high pressure hydrogenation of coconut oil.

Example 9C 900 g. mixed scrap; 54 g. mono-n-octa decenyl amine; and 90 g. solvent naphtha. Treat for 8 hours at 200 lbs. steam pressure.

Example 9D 600 g. mixed scrap; 30 g. mono-n-heptylamine; and 50 g. solvent naphtha. Treat for 5 hours at 200 lbs. steam pressure.

Example 9E 900 g. mixed scrap; 54 g. of a mixture consisting of 75 parts of di-n-octa decylamine and 25 parts of tri-n-octadecylamine. Treat for 6 hours at 180 lbs. steam pressure.

Example 9F 600 g. mixed scrap; 48 g. of a mixture of equal parts of mono-n-octa-decenyl and mono-n-octa-deca-dienyl amine; and 60 g. solvent naphtha. Treat for 7 hours at 190 lbs. steam pressure.

Example 10A 500 g. neoprene tirescrap; 30 g. ar-tetra hydro-beta naphthylamine; and 50 g. solvent naphtha. Treat for 9 hours at 175 lbs. steam pressure.

Example 10B 600 g. neoprene gasket scrap, 36 g. of 1-2 phenylene diamine and 60 g. solvent naphtha. Treat for 6 hours at 200 lbs. pressure.

Example 11

600 g. Buna-S scrap; 36 alpha-naphthylamine; and 60 g. solvent naphtha. Treat for 8 hours at 175 lbs. steam pressure.

Example 12

600 g. Buna-N-type scrap; 60 g. di-beta-naphthylamine; and 60 g. solvent naphtha. Treat for 8 hours at 200 lbs. steam pressure.

Example 13

500 g. mixed scrap; 50 g. diphenylamine; 50 g. solvent naphtha. Treat for 7 hours at 200 lbs. steam pressure.

Example 14

900 g. mixed scrap; 36 g. ac-tetra-hydro-beta-naphthylamine; and 90 g. solvent naphtha. Treat for 5 hours at 190 lbs. steam pressure.

Example 15

900 g. neoprene scrap; 45 g. ethylaniline; and 90 g. solvent naphtha. Treat for 5 hours at 200 lbs. steam pressure.

Example 16

600 g. Buna-S scrap; 36 g. benzylamine; and 60 g. solvent naphtha. Treat for 7 hours at 190 lbs. steam pressure.

Example 17

600 g. Buna-N type scrap; 42 g. p-tert. amyl-aniline; and 60 g. solvent naphtha. Treat for 8 hours at 200 lbs. steam pressure.

Example 18

600 g. Thiokol scrap; 18 g. toluidine; and 60 g. solvent naphtha. Treat for 5 hours at 150 lbs. steam pressure.

Example 19

900 g. mixed scrap; 45 g. xylidine; and 90 g. solvent naphtha. Treat for 6 hours at 200 lbs. steam pressure.

Example 20

300 g. neoprene gasket scrap; 15 g. mono-butylamine palmitate; and 30 g. solvent naphtha. Treat for 5 hours at 200 lbs. steam pressure.

Example 21

500 g. Buna-S tirescrap; 20 g. mono-amylamine stearate; and 50 g. solvent naphtha. Treat for 7 hours at 200 lbs. steam pressure.

Example 22

400 g. Buna-N type tirescrap; 24 g. mono-butylamine laurate; and 70 g. solvent naphtha. Treat for 9 hours at 190 lbs. steam pressure.

Example 23

300 g. Thiokol scrap; 12 g. mono-amylamine laurate; and 30 g. solvent naphtha. Treat for 5 hours at 200 lbs. steam pressure.

Example 24

900 g. mixed rubber scrap; 36 g. of a mixture of equal parts of mono-butylamine palmitate; mono-amylamine palmitate, mono-butylamine laurate, mono-amylamine laurate, mono-butylamine stearate, mono-amylamine stearate; and 90 g. solvent naphtha. Treat for 6 hours at 200 lbs. steam pressure.

The foregoing examples describe steam pressures of about 150 to 200 pounds and when calulated as temperatures in accordance with the "Handbook of Chemistry and Physics, 24th Edition," the temperatures in degrees for the gage pressures in even numbers are 366° F. to 388° F. and when calculated as far as tenths of degrees, the temperatures are from 365.9° F. to 387.9° F.

While it will be understood that the usual softeners can be added during or after the reclaiming process, I prefer not to do so as it interferes with the physical properties of the final product. Likewise it will be understood that the usual fillers, accelerators and other compounding ingredients may be employed subsequently to the reclaiming process.

In the above examples the percentages and quantities have been varied widely to illustrate different applications of the invention. These quantities and percentages are given as examples only. Different synthetic or natural rubber scrap will have to be treated according to its peculiar properties, and the time, temperature and pressure of the treatment, as well as the amount of treating agent should be varied accordingly.

The result of my reclaiming process is to convert the crumb-like, granular, non-coherent waste rubber which cannot be worked on a rubber mill into a coherent tacky mass which can be converted into a smooth sheet immediately when being worked. My process described herein makes it possible to convert the crumb-like, granular rubber material into a continuous sheet with relatively small force and consequently with the expenditure of relatively small amount of power and time.

In each example, the mixture is subjected to pressure as well as to moist heat. As far as I have been able to ascertain the presence of moisture greater than that of the atmosphere appears to be essential to the satisfactory operation of my improved process. Accordingly, I have used the term moist heat to indicate the presence of moisture greater than that of the atmosphere, for instance, that specified in the several examples. The above examples show the times, temperatures, and pressures which were used for the particular mixtures in question, but other combinations of times, temperatures and pressures are possible for the same mixtures.

In the foregoing description and examples, I have described the novel processes to be employed in accordance with my invention in reclaiming natural and synthetic fully or partly vulcanized or scorched rubbers without reference to whether the scrap never contained fibers, or has been de-fibered, or is being simultaneously de-fibered, or still contains fibers from fabric or textile cords such as are usually found in commercial rubber scrap because the presence of fiber or of de-fibering agents does not interfere with the action of the reclaiming substance. Accordingly, in the claims I do not limit myself to the treatment of scrap which does not contain textile fibers.

I am aware that amines have been sometimes used in compounding rubber as softeners and antioxydants and even as vulcanizing agents but I believe myself the first to discover the possibility of treating waste rubber which has been vulcanized, and particularly all kinds of rubber including natural and synthetic rubbers, with amines and thereby restoring the rubber to a condition in which it can be again successfully processed. Accordingly, in the claims I intend expressly to exclude the compounding of rubber with amines, and, therefore, use the phrase previously vulcanized rubber to mean fully or partially vulcanized or scorched rubbers whether natural or synthetic.

The present case is a continuation in part, and with respect to common subject matter, of our prior application filed July 21, 1941, Serial No. 403,372.

I claim:

1. A process of reclaiming scrap containing vulcanized polychloroprene which comprises heating the same in a comminuted condition and in the presence of water at a temperature between about 366° F. and about 388° F. in the presence of an alkyl amine.

2. The process of reclaiming a vulcanized rubbery polymer selected from the group consisting of choroprene polymers and butadiene 1, 3, polymers and mixtures thereof comprising subjecting a mixture of the vulcanized rubbery polymer with a mono-amino compound which is ammonia having at least one hydrogen thereof replaced by a monovalent hydrocarbon radical to live steam.

3. The process of claim 2 in which the said rubbery polymer is present in a mixture thereof with vulcanized natural rubber.

4. A polychloroprene having been reclaimed by the process of claim 2, said reclaimed material being vulcanizable with sulphur.

5. The process according to claim 2 wherein the rubbery polymer is a chloroprene polymer.

6. The process according to claim 2 wherein the rubbery polymer is a butadiene 1, 3 polymer.

7. The process of claim 2 wherein the mon-amino compound is an alkyl amine.

8. The process of claim 2 wherein the mon-amino compound is an aryl amine.

9. The process of claim 2 wherein the mon-amino compound is laurylamine.

10. The process of claim 2 wherein the mon-amino compound is alpha-naphthyl amine.

11. The process of claim 2 wherein the mon-amino compound is butyl amine.

12. A mixture of polychloroprene and butadiene polymers having been reclaimed by the process of claim 2, said reclaimed material being vulcanizable with sulphur.

RÉE VILMA LE BEAU.

REFERENCES CITED

The following references are of record in the file of this patent:

UNITED STATES PATENTS

| Number | Name | Date |
| --- | --- | --- |
| 1,235,850 | Spence | Aug. 7, 1917 |
| 2,273,506 | Bachle | Feb. 17, 1942 |
| 2,280,484 | Gumlich | Apr. 21, 1942 |
| 2,304,549 | Dasher | Dec. 8, 1942 |
| 2,324,980 | Kilbourne | July 20, 1943 |
| 2,338,427 | Gumlich | Jan. 4, 1944 |
| 2,234,215 | Youker | Mar. 11, 1941 |
| 1,532,213 | Winkelmann | Apr. 7, 1925 |

FOREIGN PATENTS

| Number | Country | Date |
| --- | --- | --- |
| 8,378 | Great Britain | 1905 |

OTHER REFERENCES

India Rubber World of Nov. 1, 1941, pp. 150 to 152.

Wertheim, "Textbook of Inorganic Chemistry," 2nd ed., pages 456 and 457, pub. 1945.

Dubosc, Revue Gen du Caoutchouc, page 13, No. 47, vol. 5, Dec. 1928.